No. 878,346. PATENTED FEB. 4, 1908.
E. CLARK.
WATCHMAKER'S HAIR SPRING GAGE.
APPLICATION FILED APR. 19, 1907.
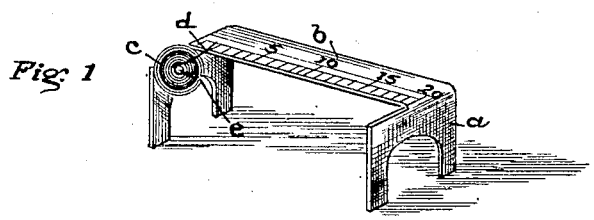
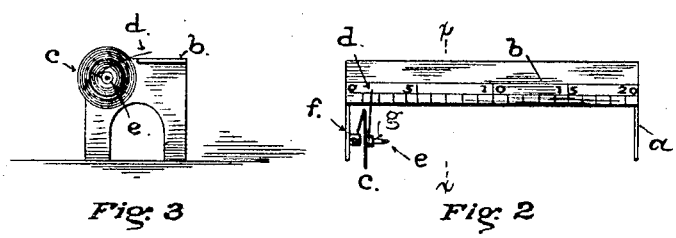
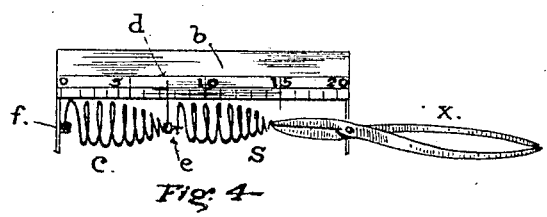
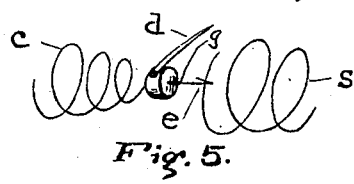
Witnesses:
L. M. Frank
Alice D. Harrison
Inventor:
Elijah Clark
E. E. Osborn
By his Atty.

UNITED STATES PATENT OFFICE.

ELIJAH CLARK, OF ALAMEDA, CALIFORNIA, ASSIGNOR TO JOSEPH NORDMAN, OF SAN FRANCISCO, CALIFORNIA.

WATCHMAKER'S HAIR-SPRING GAGE.

No. 878,346.      Specification of Letters Patent.      Patented Feb. 4, 1908.

Application filed April 19, 1907. Serial No. 369,164.

*To all whom it may concern:*

Be it known that I, ELIJAH CLARK, a citizen of the United States of America, resident of the city of Alameda, county of Alameda, and State of California, have invented new and useful Improvements in Watchmakers' Hair-Spring Gages, of which the following is a specification.

This invention has for its object to provide a simple and inexpensive hair-spring gage, or device for determining the comparative strength or stiffness of a hair-spring.

The device is intended more particularly for the use of the watch-maker in repair-work, to afford a ready means for ascertaining the relative strength, or resiliency, of one hair-spring with respect to another, and thereby facilitate the operation of selecting from a number of springs one of like qualities to the spring that is to be replaced.

To such end and object, chiefly, my said invention consists in a comparison gage for watchmakers' use, having a scale, an extensible spring having one end attached to a fixed point at one end of the scale and provided with a pointer at the opposite end for indicating on the scale the movement of the spring and the extent of its expansion when drawn out, and having on the movable end a means for temporarily attaching thereto the end of the spring to be compared.

The accompanying drawing fully illustrates a comparison-gage of my invention, and the mode of using the same.

Figure 1 is a perspective-view of the gage. Fig. 2 is a top-view. Fig. 3 is an elevation in transverse section on the left of the section-line $x$—$x$ Fig. 2. Fig. 4 is a top-view illustrating the manner of determining the relative strength of a hair-spring for comparing it with another spring by a similar test. Fig. 5 is an enlarged view showing the connecting means between the two springs.

The scale $b$ and its supports $a$—$a$ are preferably formed in one piece; being readily cut or stamped out of sheet metal, and afterwards bent to shape. The legs are designed to support the scale in a horizontal position at a convenient height above the surface of the workmen's bench, and to afford as well a point of attachment and a support for one end of a spiral spring $c$ in front of the scale. One end of the spring $c$ is attached to a boss or block $f$ on the face of the support at one end of the scale, and the other and inner end of the spiral is left free to be drawn longitudinally or parallel to the line of the scale. On this free end a pointer $e$ fixed thereto, extending laterally towards and over the scale constitutes a means for indicating on the scale the movement of the pointer-carrying end of the spring $c$, and thus registering the extent or degree to which the spring may be drawn out when testing a hair-spring. In that operation the hair-spring which is to be replaced by a new one is first placed in the instrument, and its relative stiffness and other qualities are measured, after which it is removed and the hair-spring to be substituted for it is selected by testing several hair-springs one after another, and selecting the one that is found to have the same or approximately the same qualities, according to the scale. A ready means for temporarily attaching the hair-spring to the spring $c$ in the gage, is provided on the end of the innermost coil of the spring, consisting of a short post $g$ having a barbed- or hook-shaped point $e$, on which the end of the hair-spring will readily catch and thus be attached to the end of the spring $c$.

In proceeding to select from a number of springs one to replace the hair-spring removed from a watch, the spring to be replaced is first attached to the hook $e$ on the spring $c$, and the end of the smallest coil of the hair-spring being grasped by a pair of pincers $x$, it is drawn outward along the edge of the scale, until the limit of its extensibility, consistent with safety, is reached. The extent of such movement, as marked on the scale by the pointer carried by the inner coil of the spring $c$, indicates the extensibility and the relative stiffness of the hair-spring; and, after the same is noted, the hair-spring is detached from the spring $c$. In the same manner the hair-springs from which the selection is to be made are attached to the spring $c$ and their relative qualities of stiffness are measured one after another until one is found that measures the same degree of stiffness, according to the scale, as the one first tested, or is sufficiently close thereto to adapt it for use.

With a little experience a workman can determine by comparison the proper quality or character of a hair-spring to be substituted for another, and make a reliable selection from a number with little or no loss of time.

What I claim and desire to secure by Letters Patent, is:—

1. A watchmaker's hair-spring gage comprising a scale, a support therefor, a spiral hair spring having one end attached to the support, and extensible from said point of attachment along the scale, means for temporarily attaching to the remaining end of the said spring the hair-spring to be tested, and an indicating-device on the said spiral spring for marking on the scale the movement of the said spring under extension.

2. In a hair-spring gage the combination of a scale, a support therefor, a spiral hair spring having its outermost coil attached to the support, a pointer carried by the innermost coil of said spring, and means for attaching to the said innermost coil one end of the hair-spring to be tested.

3. In a watchmaker's hair spring gage, the combination of a horizontally arranged scale, supports therefor, a hair spring having its outer convolution attached to one of said supports and its opposite end free, a pointer attached to the free end and movable substantially parallel to said scale, and means on the free end of the spring for connecting thereto a hair spring to be tested.

ELIJAH CLARK.

Witnesses:
 JOHN H. WARE,
 L. M. FRANK.